May 26, 1936.  C. S. HAZARD ET AL  2,041,762
INTERLOCK FOR METER CASINGS
Filed June 28, 1934
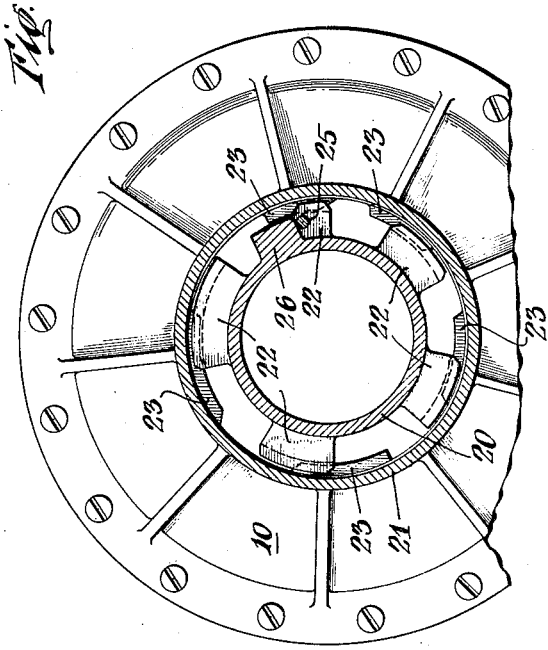
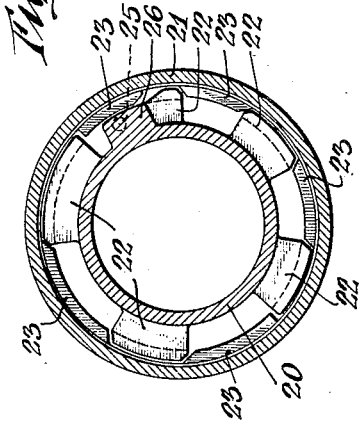
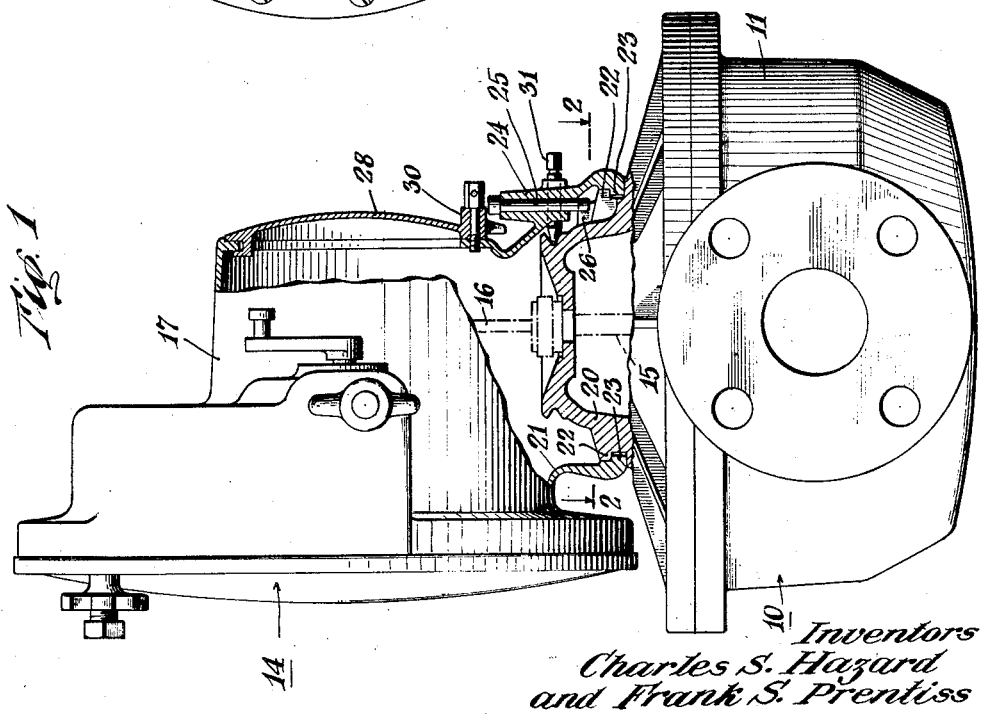
Inventors
Charles S. Hazard
and Frank S. Prentiss
BY Hoguet & Neary
ATTORNEYS Patented May 26, 1936

2,041,762

UNITED STATES PATENT OFFICE 2,041,762

INTERLOCK FOR METER CASINGS

Charles S. Hazard, New York, and Frank S. Prentiss, Flushing, N. Y., assignors to Neptune Meter Company, a corporation of New Jersey Application June 28, 1934, Serial No. 732,770

5 Claims. (Cl. 73—167)

This invention relates to interlocking devices and particularly to devices for interlocking casings that enclose the metering and registering elements of a fluid meter or the like.

When fluid meters are mounted on gasoline trucks they are subjected to considerable vibration that is apt to result in loosening of the fastening devices securing the casing enclosing the registering elements to the casing enclosing the metering elements with consequent possible detachment and loss of the registering casing. This is a matter of considerable importance where, as is sometimes the case, the metering and registering devices are constructed as separate units supported and enclosed within individual casings that are assembled to complete the meter, since the loosening of the fastening devices between the casings by vibration may result in the loss of the entire registering unit. It is also desirable to provide for rotary adjustment of the register casing on the metering casing to enable the indicating elements to be viewed from a desired position relatively to the metering device.

One object of the present invention is to provide means for interlocking the casings of a meter to prevent improper or accidental detachment of the registering casing from the metering casing.

Another object is to provide interlocking means that permit ready relative adjustment of the registering casing on the meter casing.

Other objects and advantages of the invention will become apparent upon consideration of the following detailed description and appended claims when read in conjunction with the appended drawing in which:

Figure 1 is a side elevational view, partly in section, of a fluid meter embodying the interlocking means for the registering and metering casings in accordance with the present invention;

Figure 2 is a sectional view on the line 2—2 of Figure 1 showing the interlocking means in cooperative relation to prevent detachment of the register casing; and Figure 3 is a fragmentary view similar to Figure 2 but showing the register housing rotatively positioned to permit its detachment.

Referring to the drawing, the fluid meter comprises a metering unit 10 for measuring the flow of fluid passing through its casing 11 and a registering unit 14 mounted on the meter casing for operation by the metering device to indicate and register the quantity of fluid passing through the meter. Inasmuch as neither the metering nor registering units per se form any part of the present invention their detailed construction is not illustrated and will not be described, it being deemed sufficient to state that the shaft 15 of the metering unit, operated by a rotor or the like in response to the flow of fluid, drives the shaft 16 of the registering unit to register the flow of fluid. The invention will be described in conjunction with a fluid meter of the type in which all of the measuring elements and all of the registering elements are supported and enclosed within their respective casings 11, 17, so that each is a separate unit adapted to be associated with the other to provide a complete registering meter, the gears on the meter shaft 15 and register shaft 16 being readily meshed when the registering unit is mounted on the metering unit.

The casing 11 of the metering unit is formed with a neck portion 20 over which a skirt portion 21 at the base of the casing 17 of the registering unit is axially engageable to mount the registering unit on the metering unit. For convenience of description, the casing of the registering unit will be referred to hereafter as a "housing". The neck portion 20 of the casing 11 is provided on its exterior surface with a plurality of circumferentially arranged lugs 22 spaced to permit similar lugs 23 on the interior surface of skirt 21 to pass between them. Although each series of lugs 22 and 23 is shown in Figure 1 as arranged in a single circumferential row on the casing and housing, respectively, other arrangements may be adopted. When the housing is mounted on the casing the lugs 23 on housing 17 are disposed below the lugs 22 on casing 11 and become overlapped by the lugs 22 when the housing is turned on the casing, as is illustrated in Figures 1 and 2.

In the embodiment of the invention illustrated, the lugs 22 of casing 11 are of various sizes and the spacing between adjacent lugs also varies. Likewise the sizes and spacings of the lugs 23 on housing 17 are varied; it being understood, however, that the sizes and spacings of the lugs 23 on the housing permit the lugs 23 to pass between certain lugs 22 on the casing. With this irregular arrangement in the sizes and spacings of the lugs on the housing and casing there is only a single rotative position in which the skirt 21 of housing 17 may be engaged over the neck 20 of casing 11 so that the lugs 23 clear the lugs 22 in order to position the skirt axially of the neck for disposing the lugs 23 below the lugs 22. When housing 17 is turned on casing 11 the lugs 23 become overlapped by the lugs 22, as shown in Figure 2, thus preventing axial movement of the housing to detach it from the casing.

Housing 17 is formed with a boss 24 provided with a bore in which a pin 25 is loosely mounted. Upon alignment of the lugs 23 on housing 17 with the proper spaces between the lugs 22 on casing 11, as shown in Figure 3, the end of pin 25 rests upon the top of a stop lug 26 on the neck portion of the casing. When the housing is turned on the casing, pin 25 drops off lug 26 and becomes positioned to engage a side face of the lug. As shown in Figure 1, stop lug 26 is positioned on neck 20 above the circumferentially arranged interlocking lugs 22 thereon. Locking pin 25 is formed with a flanged head engaging boss 24 to prevent the inner end of the pin dropping into the plane of the lugs 22. Thus, the end of the locking pin is disposed short of the plane of the circumferentially arranged interlocking lugs 22 on casing 11 so that it does not interfere, by engaging these lugs, with the rotative adjustment of housing 17 on casing 11. Lug 26 is disposed intermediate a pair of lugs 22 on casing 11 for engagement by pin 25 on the housing to limit the rotative movement of the latter so as to prevent realignment of the lugs 23 on housing 17 with the proper spaces between the lugs 22 to clear the latter until pin 25 is raised. Lug 26 is preferably short in its extent circumferentially of neck 20 so that housing 17 may, while fully interlocked against axial separation from casing 11, be turned nearly a full revolution thereon to adjust the registering elements carried by the housing 17 for observation from various positions with respect to the meter casing 11. In other words, housing 17 may, while fully interlocked with casing 11, be turned through a full circle except for that portion occupied by the lug 25. The radial position of stop lug 26 is such that it does not interfere with the lugs 23 on housing 17 as the lugs 23 on the housing are passed through the spaces between the lugs 22 on the casing when mounting the housing on the casing. A plate 28, as for example, a cover that is removable to afford access to certain parts of the registering device in housing 17, is provided with a boss 30 overlying the end of pin 25 to prevent the pin being shaken out or otherwise improperly removed.

From the foregoing it may be seen that since stop lug 26 and pin 25 limit the rotative movement of the housing 17 on the casing 11 and, thus, prevent alignment of each lug 23 on the housing with the single space through which it may pass between the lugs 22 on the casing, some of the lugs on the housing and casing are always in overlapping relation with the result that axial movement of the housing to detach it is prevented. Pin 25 and stop lug 26 also serve as an index in detaching the housing in that when the housing is rotated to bring pin 25 into engagement with stop lug 26, as shown in Figure 2, the housing lugs 23 are nearly in alignment with the spaces through which they may pass. On removal of boss 30 on cover 28 from above the end of pin 25 the latter may be raised and the housing turned further to bring the housing lugs 23 into alignment with the proper spaces between the casing lugs 22, as shown in Figure 3, to clear the latter so that the housing may be detached.

It should also be noted that while the housing and casing are securely and safely interlocked as described above, the interlocking means permits rotative adjustment of the housing on the casing to the extent of nearly a full revolution so that the indicating devices of the registering unit may be viewed from nearly any desired position relatively to the metering unit. It is to be understood that a suitable friction drive or other slip connection is provided in association with the gearing between meter shaft 15 and register shaft 16 so that the register housing may be rotatively adjusted on the meter casing without affecting the reading of the registering elements or disturbing the flow responsive elements of the meter. A set screw 31 carried by the skirt 21 of housing 17 is provided for engaging the neck 20 of casing 11 to hold the housing in its adjusted position.

It should be understood that although the invention has been described in conjunction with the casings of metering and registering units which are complete entities in the sense that they not only enclose but also support the related metering or registering units the interlocking means of the invention is likewise applicable to meters in which either, or both, of the casings are merely hoods to cover the registering and/or metering elements.

There are many changes and variations which may be made without departing from the invention and, therefore, it is intended to include all such changes and variations within the scope of the appended claims.

We claim:

1. In combination with interlocking means for a casing and a housing rotatably mounted thereon, said interlocking means including a plurality of spaced lugs on said casing and a plurality of spaced lugs on said housing adapted to be overlapped by the plurality of spaced lugs on said casing to interlock the housing to the casing in every rotative position of said housing thereon except a single rotative position in which each lug on said housing aligns with and may pass through a corresponding space between adjacent lugs on said casing; a locking pin carried by said housing; and a stop lug on said casing positioned relatively to said plurality of lugs on said casing for engagement by said locking pin to prevent movement of said housing to said single rotative position for aligning the lugs thereon with the related spaces intermediate lugs on said casing while otherwise permitting free rotative adjustment of said housing on said casing.

2. In combination with interlocking means for a casing and a housing rotatably mounted thereon, said interlocking means including a plurality of spaced lugs on said casing and a plurality of spaced lugs on said housing adapted to be overlapped by the plurality of spaced lugs on said casing to interlock the housing to the casing in every rotative position of said housing thereon except a single rotative position in which each lug on said housing aligns with and may pass through a corresponding space between adjacent lugs on said casing; a stop lug on said casing disposed out of the plane of said interlocking lugs thereon; and a locking pin carried by said housing and positioned to engage said stop lug for limiting the movement of said housing to prevent movement thereof to said single rotative position for aligning the lugs on said housing with said spaces between lugs on said casing while permitting said housing to be otherwise rotatably adjusted on said casing.

3. In combination with interlocking means for a casing and a housing rotatably mounted thereon, said interlocking means including a plurality of spaced lugs on said casing and a plurality of spaced lugs on said housing adapted to be overlapped by the plurality of spaced lugs on said casing to interlock the housing to the casing in every rotative position of said housing thereon except a single rotative position in which each lug on said housing aligns with and may pass through a corresponding space between adjacent lugs on said casing; a locking pin carried by said housing; and a stop lug on said casing positioned relatively to said plurality of lugs on said casing for engagement by said locking pin to prevent movement of said housing to said single rotative position for aligning the lugs thereon with the related spaces intermediate lugs on said casing, said locking pin being disposed out of the plane of the said plurality of lugs on said casing for obviating engagement therewith to permit rotative movement of said housing on said casing within the limits permitted by said stop lug.

4. Interlocking means for a casing and a housing mounted thereon comprising a neck on said casing; a skirt on said housing engageable over the neck of said casing for mounting said housing thereon; a plurality of spaced members on said neck; a pluraity of spaced members on said skirt overlapped by said members on said casing, said housing being movable on said casing to align the members on said skirt with spaces intermediate members on said neck; a removable locking pin carried by said housing; a stop lug on said casing disposed relatively to the lugs thereon for engagement by said locking pin to prevent movement of said housing to a position for aligning the lugs on said skirt with the spaced intermediate lugs on said neck; and means on said housing engageable by said pin and acting to maintain it positioned to engage the stop lug on said casing to prevent detachment of said housing from said casing.

5. Interlocking means for a casing and a housing mounted thereon comprising a neck on said casing; a skirt on said housing engageable over the neck of said casing for mounting said housing thereon; a plurality of spaced members on said neck; a plurality of spaced members on said skirt overlapped by said members on said casing, said housing being movable on said casing to align the members on said skirt with spaces intermediate members on said neck; a removable locking pin carried by said housing; a stop lug on said casing disposed relatively to the lugs thereon for engagement by said locking pin to prevent movement of said housing to a position for aligning lugs on said skirt with spaces intermediate lugs on said neck; and means on said housing overlying one end of said locking pin and engageable thereby to maintain it positioned to engage the stop lug on said casing.

CHARLES S. HAZARD.
FRANK S. PRENTISS.